(12) United States Patent
Kim

(10) Patent No.: US 7,570,312 B2
(45) Date of Patent: Aug. 4, 2009

(54) LIQUID CRYSTAL DISPLAY MODULE HAVING REPLACEABLE LIGHT SOURCES

(75) Inventor: Jong Dae Kim, Kyoungki-do (KR)

(73) Assignee: Hydis Technologies, Co., Ltd., Gyeonggi-Do (KR)

( * ) Notice: Subject to any disclaimer, the term of this patent is extended or adjusted under 35 U.S.C. 154(b) by 0 days.

(21) Appl. No.: 11/264,394

(22) Filed: Nov. 1, 2005

(65) Prior Publication Data
US 2006/0203140 A1    Sep. 14, 2006

(30) Foreign Application Priority Data
Mar. 10, 2005    (KR) ...................... 10-2005-0020092

(51) Int. Cl.
*G02F 1/1333*    (2006.01)

(52) U.S. Cl. .............................. 349/56; 349/58; 349/60; 349/61; 349/65; 349/67; 349/69; 349/150; 349/192; 361/748; 362/612; 362/631

(58) Field of Classification Search ................... 349/56, 349/58, 150, 61–71; 361/748; 439/620.25
See application file for complete search history.

(56) References Cited

U.S. PATENT DOCUMENTS

| | | | | |
|---|---|---|---|---|
| 6,502,968 | B1* | 1/2003 | Simon | 362/489 |
| 6,543,904 | B1* | 4/2003 | Martinez-Gottschalk et al. | 362/29 |
| 7,113,236 | B2* | 9/2006 | Du | 349/58 |
| 2002/0180923 | A1* | 12/2002 | Aoyagi et al. | 349/149 |
| 2004/0202006 | A1* | 10/2004 | Pien | 362/545 |
| 2004/0257492 | A1* | 12/2004 | Mai et al. | 349/61 |
| 2005/0018102 | A1* | 1/2005 | Hirano | 349/58 |

FOREIGN PATENT DOCUMENTS

KR    10-2001-0011255 A    2/2001

* cited by examiner

*Primary Examiner*—Andrew Schechter
*Assistant Examiner*—Lauren Nguyen

(57) ABSTRACT

Disclosed is a liquid crystal display module which makes it possible to reduce the number of components and manufacturing processes of the liquid crystal display module and to easily replace a failed LED of a backlight unit that irradiates light onto a liquid crystal panel when the LED fails. In the liquid crystal display module, an electric signal is transferred to the liquid crystal panel and the LED through a flexible printed circuit board, and the flexible printed circuit board is electrically and physically connected to the LED by connecting a coupling pin of the LED with a socket of the flexible printed circuit board. In the case in which an LED fails, the coupling pin of the failed LED can be detached from the socket of the flexible printed circuit board, and thus the LED can easily be replaced.

4 Claims, 3 Drawing Sheets

LIQUID CRYSTAL DISPLAY MODULE HAVING REPLACEABLE LIGHT SOURCES

BACKGROUND OF THE INVENTION

1. Field of the invention

The present invention relates to a liquid crystal display module, and more particularly to a liquid crystal display module which makes it possible to reduce the number of components and manufacturing processes of the liquid crystal display module and to easily replace a failed LED of a backlight unit when the LED fails.

2. Description of the Prior Art

A liquid crystal display module should include a backlight unit for irradiating light onto a liquid crystal display panel, since it is not a self-luminous display.

A conventional liquid crystal display module will now be described with reference to FIG. 1.

The conventional liquid crystal display module includes a backlight unit having an LED 11 for emitting light, a light guide plate 13 for delivering the light emitted from the LED 11 into a liquid crystal panel 12 for displaying a picture, a reflective sheet 18, bonded to the rear side of the light guide plate 13 by an adhesive 14, for reflecting the light from the rear side of the light guide plate 13 onto the light guide plate 13, a diffusing sheet 15, a prism sheet 16, and a protective sheet 17, the sheets 15, 16, and 17 being arranged on a front side of the light guide plate 13 in order, and the above components being layered and assembled in a mold frame to irradiate surface light onto the liquid crystal panel 12; a first flexible printed circuit board 19 for transmitting an electric signal to the liquid crystal panel 12; and a second flexible printed circuit board 20 for transmitting an electric signal to the LED 11.

In such a conventional liquid crystal display module, the flexible printed circuit board 19 and the second flexible printed circuit board 20 are electrically and physically connected to each other through soldering process. Also, the LED 11 is electrically and physically connected to the second flexible printed circuit board 20 through a soldering process.

Hence, the conventional liquid crystal display module requires the first and second flexible printed circuit boards 19 and 20 and an additional soldering process for connecting the first and second flexible printed circuit boards 19 and 20. In addition, in case the LED 11 fails in the conventional liquid crystal display module, it is impossible to extract the failed LED from the second flexible printed circuit board 20. Consequently, the conventional liquid crystal display module requires separate components and manufacturing process, so that time and cost required to manufacture it increase. Also, when the LED 11 fails, the replacement of the failed LED is not possible, and this causes defects in the entire liquid crystal display module.

SUMMARY OF THE INVENTION

Accordingly, the present invention has been made to solve the above-mentioned problems occurring in the prior art, and an object of the present invention is to provide a liquid crystal display module which makes it possible to reduce manufacturing time and cost of the liquid crystal display module and to reduce defects in the liquid crystal display module by integrally forming a flexible printed circuit board for driving a liquid crystal panel with a flexible printed circuit board for driving a light source and detachably connecting the light source with the flexible printed circuit board so that a failed LED can easily be replaced.

In order to accomplish this object, there is provided a liquid crystal display module, according to the present invention, which includes a liquid crystal panel having a front screen for displaying a picture and a first side; a backlight unit arranged on a rear side of the liquid crystal panel and having a light guide plate and a light source arranged on a side of the light guide plate corresponding to the first side of the liquid crystal panel; and a printed circuit board extended from the first side of the liquid crystal panel to a rear side of the backlight unit and connected to the light source of the backlight unit.

In the above-described construction, the light source has a coupling pin and the printed circuit board has a socket, so that the coupling pin of the light source is detachably connected to the socket of the printed circuit board.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
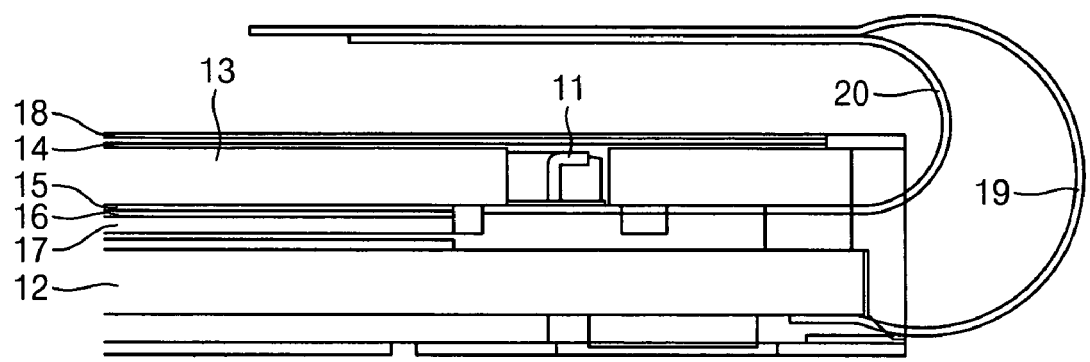
FIG. 1 is a view explaining a conventional liquid crystal display module.

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 2:
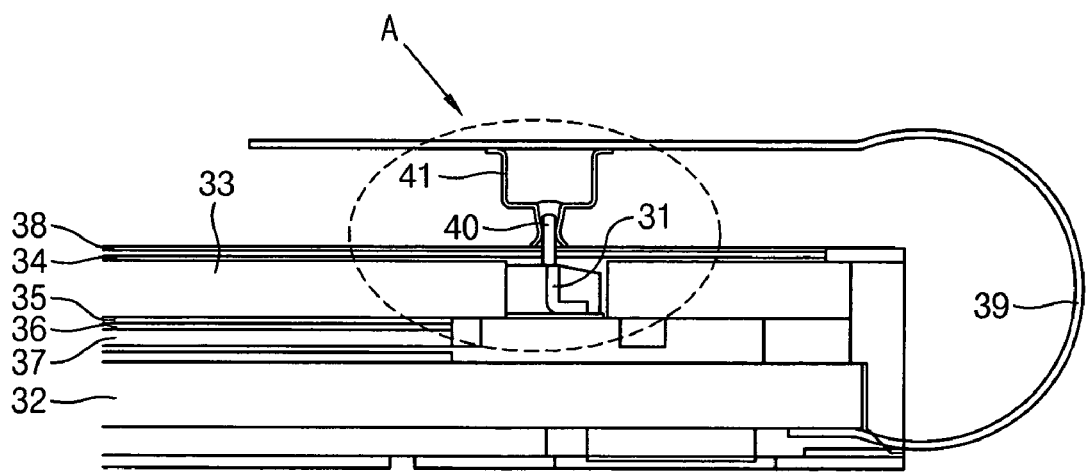
FIGS. 2 through 6 are views explaining a liquid crystal display module according to an embodiment of the present invention.
Figure 3:
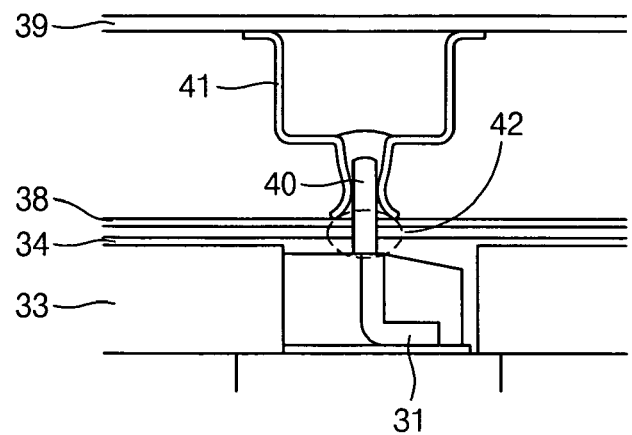

FIGS. 2 and 3 are views explaining a liquid crystal display module according to an embodiment of the present invention. Specifically, FIG. 2 is a cross-sectional view of the liquid crystal display module according to the present invention, and FIG. 3 is a partially enlarged cross-sectional view of a circle A in FIG. 2.

The liquid crystal display module according to an embodiment of the present invention includes a backlight unit having an LED 31 for emitting light, a light guide plate 33 for delivering the light emitted from the LED 31 to a liquid crystal panel 32 for displaying a picture, a reflective sheet 38, bonded to the rear side of the light guide plate 33 by an adhesive 34, for reflecting the light from the rear side of the light guide plate 33 onto the light guide plate 33, a diffusing sheet 35, a prism sheet 36, and a protective sheet 37. The sheets 35, 36, and 37 are arranged on the front side of the light guide plate 33 in order, and the above components are layered and assembled in a mold frame to irradiate surface light onto the liquid crystal panel 32. The liquid crystal module also includes a flexible printed circuit board 39 for transmitting an electric signal to the liquid crystal panel 32 and the LED 31.

In the liquid crystal display module according to an embodiment of the present invention, the flexible printed circuit board 39 transmits the electric signal to both LED 31 and liquid crystal panel 32, and the reflective sheet 38 is formed with a hole 42 through which the LED 31 is inserted and withdrawn to dispose the LED 31 on the side of the light guide plate 33. The LED 31 has a coupling pin 40 for receiving an electric signal from the flexible printed circuit board 39. The flexible printed circuit board 39 includes a socket 41 detachably connected to the coupling pin 40 of the LED.

Hence, the liquid crystal display module according to the embodiment of the present invention transmits the electric signal to the LED 31 and the liquid crystal panel 32 through one flexible printed circuit board 39, and the LED 31 is electrically and physically connected to the flexible printed circuit board 39 through connection of the coupling pin 40 and the socket 41. In addition, the liquid crystal display module according to the embodiment of the present invention may displce a failed LED 31, since the LED 31 is easily inserted or withdrawn through the hole 42 formed in the reflective sheet 38.

Replacement of the failed LED by a normal LED in the liquid crystal display module according to the embodiment of the present invention will now be explained with reference to FIGS. 4 through 6.

Figure 4:
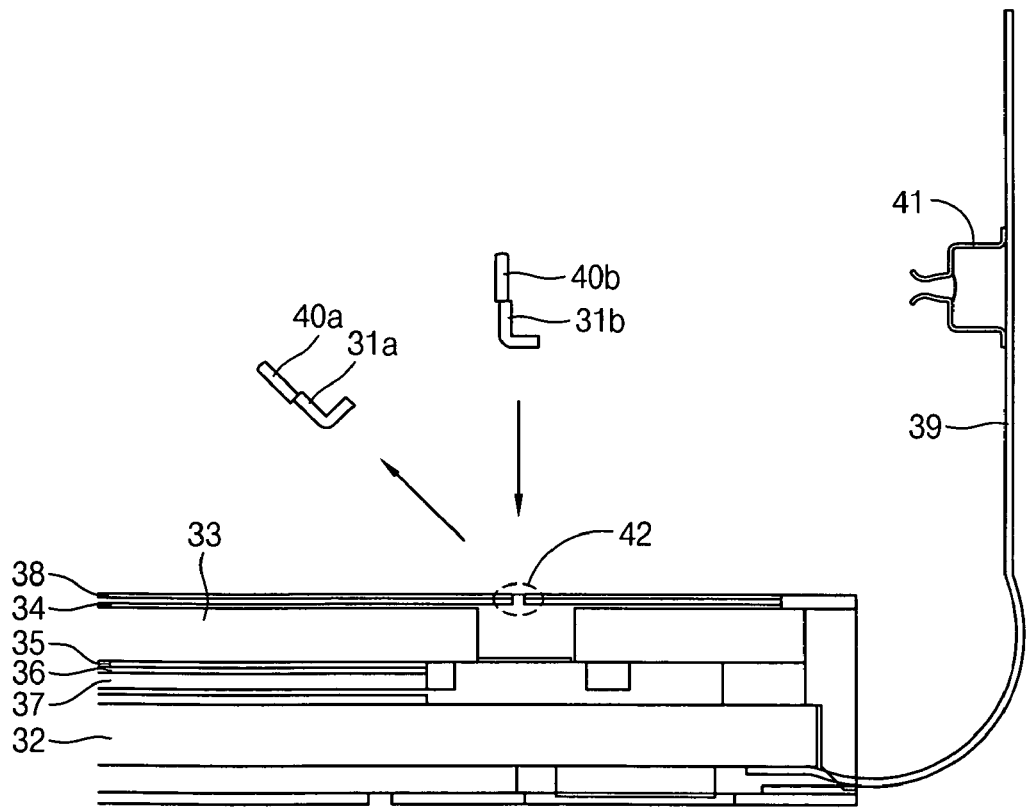
Figure 5:
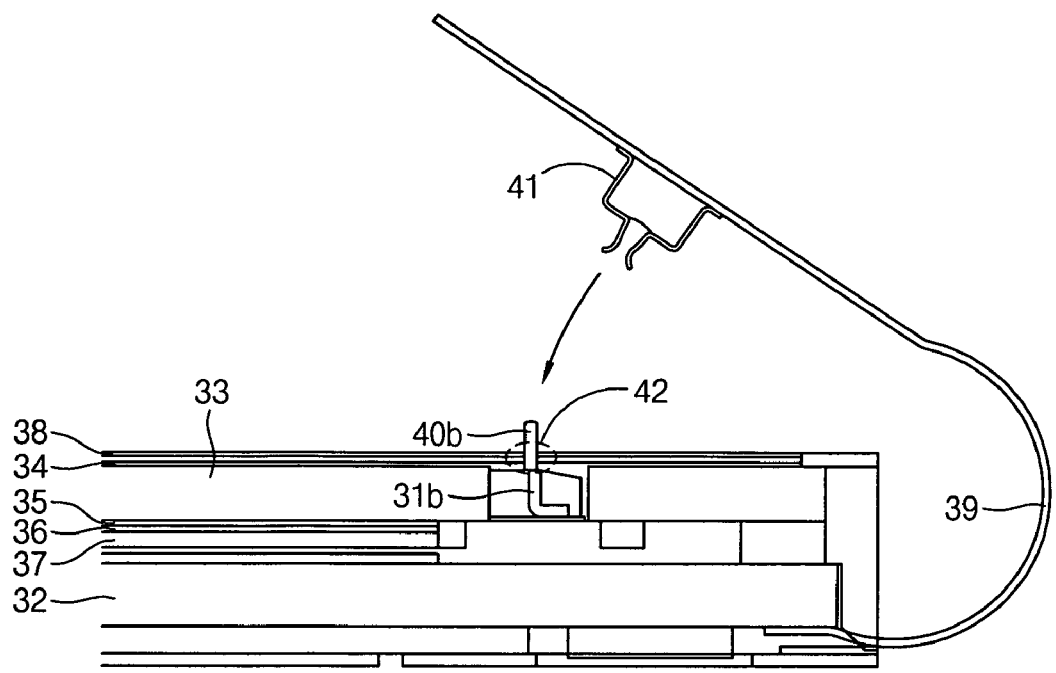

Referring to FIGS. 4 and 5, in case an LED 31*a* fails in the liquid crystal display module, the flexible printed circuit board 39 is lifted upward, and then a coupling pin 40*a* of the failed LED 31*a* is detached from the socket 41 of the flexible printed circuit board 39. Then, the reflective sheet 38 is lifted upward or is temporarily removed from the rear side of the backlight unit. The failed LED 31*a* is removed and replaced by a new LED 31*b*. If the replacement is completed, after an upper surface of the LED is covered by the lifted or eliminated reflective sheet 38, the flexible printed circuit board 39 lifted upward is lowered downward.

Figure 6:
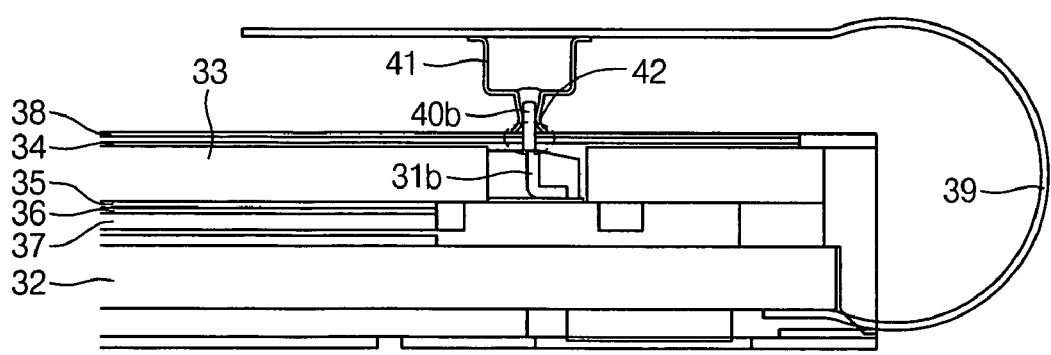

Referring to FIG. 6, the flexible printed circuit board 39 is electrically and physically connected to the normal LED 31*b* by connecting the coupling pin 40*b* of the LED 31*b* with the socket 41 of the flexible printed circuit board 39.

According to the liquid crystal display module according to the embodiment of the present invention, the electric signal is transferred to the LED 31 and the liquid crystal panel 32 through the flexible printed circuit board 39, and the flexible printed circuit board 39 is electrically and physically connected to the LED 31 by connecting the coupling pin 40 of the LED 31 with the socket 41 of the flexible printed circuit board 39. In case the LED 31 fails, the coupling pin 40 of the failed LED 31 is detached from the socket 41 of the flexible printed circuit board 39, and the LED 31 can be inserted and withdrawn through the hole 42 formed in the reflective sheet 34. As a result, the liquid crystal display module according to the embodiment can reduce the number of the components and simplify the manufacturing process. In addition, the failed LED 31 can be easily replaced.

As described above, according to the liquid crystal display module of the present invention, the components and manufacturing process required to manufacture the liquid crystal display module can be reduced and simplified, and thus time and cost required to manufacture the liquid crystal display module can be reduced to improve the reliability thereof.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A liquid crystal display module comprising:
a liquid crystal panel for displaying a picture;
a backlight unit having a light source arranged on a rear side of the liquid crystal panel to irradiate light onto the liquid crystal panel, a light guide plate for delivering the light to the liquid crystal panel, and a reflective sheet for reflecting the light from a rear side of the light guide plate onto the light guide plate, the light source including a coupling pin;
a flexible printed circuit board adjacent the back light unit, the flexible printed circuit board configured to transmit an electric signal to the liquid crystal panel and the light source, the flexible printed circuit board including an integrally connected socket;
a hole defined by the reflective sheet whereby the light source can be removably coupled to the printed circuit board through the reflective sheet,
wherein the flexible printed circuit board is constructed and arranged to be able to rotate away from the backlight unit and the light source in a first direction to a first position that said flexible circuit board is away from the backlight unit whereat a coupling pin of a light source is detached from the socket of the flexible printed circuit and;
wherein the flexible circuit board is configured and arranged to rotate from the first position, toward the backlight unit and toward the light source in a second direction, rotation of the flexible circuit board from the first position to the backlight unit and light source attaching the coupling pin of the light source to the flexible circuit board.

2. The liquid crystal display module of claim 1, wherein said flexible circuit board is configured to rotate about a geometric axis located away from, but parallel to, a side of liquid crystal panel.

3. A liquid crystal display module comprising:
a liquid crystal panel;
a backlight unit adjacent the liquid crystal panel, the backlight unit having a replaceable light source arranged to irradiate light onto a rear side of the liquid crystal panel, a light guide plate for delivering the light to the liquid crystal panel, and a reflective sheet for reflecting the light from a rear side of the light guide plate onto the light guide plate, the light source including a coupling pin that extends from the replaceable light source, substantially orthogonal to the backlight unit;
a flexible printed circuit board next to the back light unit, the flexible printed circuit board configured to transmit an electric signal to the liquid crystal panel and to the replaceable light source, the flexible printed circuit board including a socket through which an electrical signal is transmitted to the removable light source, the socket being configured to be dis-connectable from said coupling pin by rotation of the flexible circuit board away from the backlight unit and replaceable light source, said socket being configured to be re-connectable to said coupling pin by rotation of the flexible circuit board toward the backlight unit and toward the replaceable light source; and
a hole defined by the reflective sheet through which the replaceable light source can be removed from the backlight unit and replaced, after the flexible circuit board is rotated away from the backlight unit.

4. The liquid crystal display module of claim 1, wherein said flexible circuit board is configured to rotate about a geometric axis located away from, but parallel to, a side of liquid crystal panel.

\* \* \* \* \*